(12) United States Patent
Takehiro

(10) Patent No.: US 8,449,395 B2
(45) Date of Patent: May 28, 2013

(54) GAME DEVICE, GAME CONTROL METHOD, AND INFORMATION RECORDING MEDIUM

(75) Inventor: Masashi Takehiro, Minato-ku (JP)

(73) Assignee: Konami Digital Entertainment Co., Ltd., Minato-ku, Tokyo (JP)

( * ) Notice: Subject to any disclaimer, the term of this patent is extended or adjusted under 35 U.S.C. 154(b) by 94 days.

(21) Appl. No.: 13/241,813

(22) Filed: Sep. 23, 2011

(65) Prior Publication Data

US 2012/0077589 A1  Mar. 29, 2012

(30) Foreign Application Priority Data

Sep. 27, 2010  (JP) ................................. 2010-216002

(51) Int. Cl.
*A63F 9/24*  (2006.01)
(52) U.S. Cl.
USPC ................... 463/42; 463/31; 463/32; 463/33; 463/34; 463/43
(58) Field of Classification Search
USPC ......................................... 463/31–34, 42, 43
See application file for complete search history.

(56) References Cited

FOREIGN PATENT DOCUMENTS

| JP | 06-339577 A | 12/1994 |
|---|---|---|
| JP | 2005-533628 A | 11/2001 |
| JP | 2003-030686 A | 1/2003 |
| JP | 4117682 B2 | 7/2008 |
| JP | 2010-015553 A | 1/2010 |

OTHER PUBLICATIONS

Japanese Office Action with English Translation (Issued Oct. 9, 2012).

*Primary Examiner* — Omkar Deodhar
(74) *Attorney, Agent, or Firm* — Howard & Howard Attorneys PLLC

(57) ABSTRACT

The game device comprises a detection unit, an acquisition unit, a generation unit and a display unit. The detection unit detects the position of a user in real space. The acquisition unit determines clarity that is correlated with the detected position of the user. The generation unit generates an image that expresses a state of an object placed in virtual space that is drawn with the clarity determined for the object. The display unit displays the image generated by the generation unit on a screen.

9 Claims, 14 Drawing Sheets

501

500

501  901

1400

1401

GAME DEVICE, GAME CONTROL METHOD, AND INFORMATION RECORDING MEDIUM

CROSS-REFERENCE TO RELATED APPLICATION

This application claims the benefit of Japanese Patent Application 2010-216002, filed on Sep. 27, 2010, the entire disclosure of which is incorporated by reference herein.

TECHNICAL FIELD

This application relates generally to a game device, a game control method and a computer readable non-transitory information recording medium with a program recorded thereon, and more particularly, to a game device, game control method and a computer readable non-transitory information recording medium with a program recorded thereon that are suitable for adjusting the standing position of a user in real space in a game that is played by reproducing a user's movement in real space in virtual space.

BACKGROUND ART

There is technology called motion capture that attaches a marker to a model such as a human, and by detecting the movement of this marker, digitizes and captures the movement of the model in real space. There is also technology for capturing the movement of a model by taking images of the movement of the model by one or a plurality of cameras, or by measuring the distance to the model using the time progression of infrared light that is irradiated on the surrounding, or measuring the phase difference of the reflected waves of that infrared light.

These technologies are used in a game in virtual space in order to move a character on the screen more naturally, for example. In Japanese Patent No. 4,117,682, a device is disclosed that makes it more possible to enjoy a game that is rich in changes by taking images of a user and following certain parts of the user such as a head, both eyes and the like.

In a game device that reproduces the movement of a user in virtual space in this way, in order to accurately capture the movement of the user, the standing position of the user with respect to the camera is important. Generally, the standing position of a user is adjusted by the user by looking at his/her own image that is displayed on the screen. Alternatively, the standing position of the user is adjusted by matching the user's own image with a human type object as a reference that is displayed on the screen.

However, these methods of adjustment cause the user to be aware of adjustment of the position, so that it becomes more difficult for the user to become intensely engaged in the game. Moreover, when these adjustments are made during the play of a game each time the user moves from a suitable position, the progression of the game has to be stopped each time, and so that it becomes difficult to become deeply involved in the game.

In order to solve such problems, the object of the present invention is to provide a game device, a game control method and a computer readable non-transitory information recording medium with a program recorded thereon that are suitable for adjusting the standing position of a user in real space in a game that reproduces the movement of the user in real space in virtual space.

SUMMARY

In order to accomplish the object above, the game device according to a first aspect of the present invention comprises a detection unit, an acquisition unit, a generation unit and a display unit, and is configured as follows.

The detection unit detects the position of a user in real space.

The acquisition unit determines clarity that is correlated with the detected position of the user.

The generation unit generates an image that expresses a state of an object placed in virtual space that is drawn with the clarity determined for the object.

The display unit displays the generated image on a screen.

An object that is placed in virtual space is an arbitrary three-dimensional shape that is formed using images. For example, an object is a main character that is operated by the user, other characters that appear in the game, a ball that is kicked by the main character, an animal, a building, a vehicle, three-dimensional geographical feature and the like.

The clarity expresses the degree of how easy it is to see the object displayed on the screen. The clarity includes all elements that change how the object appears such as the color of the object, the thickness of the lines of the object, shading, magnification rate of the size of the object and the like.

With the present invention, the clarity of an object on the screen changes according to the position of the user in real space. In other words, the way the object is seen changes according to the position of the user. As a result, when it is difficult for the user to see the object, the user can move his/her position on his/her own initiative, so that it becomes difficult to be aware that position adjustment is being performed, and thus it is possible to become more involved in the game.

Moreover, when the user is not standing in the proper position, even when the game is not stopped and there is no warning, the user adjusts his/her position on his/her own initiative so that play of the game is hindered very little. As a result, there is no need to interrupt the game in order to adjust the standing position, and as a result, the user can become more involved in the game.

In the game device of the present invention, construction can be such that the detection unit takes an image of a shape of the user, and detects the position of the user according to the position of the user located in and the size of the user in the image that was taken; and the acquisition unit further determines that the further the position is from a specified reference position the lower the clarity of the object.

Furthermore, in the game device of the present invention, construction can be such that the detection unit takes an image of the shape of the user, and detects the position of the user located in and the size of the user in the image that was taken; and the acquisition unit further determines that the greater the difference of a size of the shape of the taken image and a specified reference size the lower the clarity of the object.

As a detailed method by which the detection unit detects the user is a method, for example, in which the detection unit takes an image of the user and acquires an image, then performs image analysis of the pattern or characteristic points of that image. Moreover, by the detection unit irradiating light waves such as infrared light, then detecting the reflected light waves and analyzing the time progression or phase difference of the light waves, the distance between the detection unit and the user can be found. Based on the results of analyzing the image and the found distance, the detection unit is able to detect the position of the user in real space. The detection unit repeatedly detects the position of the user at periodic timing.

When the position of the user with respect to the detection unit is at the most suitable position, the clarity that is determined by the acquisition unit is set so that the shape of the user in the image that was taken is at a specified reference position and is a specified reference size. In this setting condition, when the user is not standing at a proper position with respect to the detection unit, the clarity becomes low. The generation unit then generates an image with low clarity and the display unit displays the object on the screen with low clarity. As a result, the user can know whether he/she is standing too close to or too far from the detection unit.

In the game device of the present invention, the generation unit can also generate the image by drawing the object while applying an image filter that corresponds to the determined clarity.

The image filter includes all kinds of filters that apply an effect to an image such as a blur filter, alpha filter, grayscale filter and the like. Accordingly, the generation unit can apply image filters having different clarity to a plurality of objects that are displayed on the screen by the display unit. In other words, on one screen it is possible to generate a plurality of objects having different clarity. For example, in the case where there is one object each on the right side of the screen and the left side of the screen as seen from the user, and the position of the user with respect to the detection unit is too close to the left side, it is possible to make the object on the right side of the screen difficult for the user to see by lowering the clarity of the object, and to make the clarity of the object on the left side of the screen high. As a result, the user feels that the object on the right side of the screen is difficult to see and knows that his/her position with respect to the detection unit is too close to the left side, and thus moves to the center of the detection unit on his/her own initiative.

In the game device of the present invention, the generation unit, after generating an image expressing the state of the virtual space, can apply an image filter that corresponds to the determined clarity to that image, and generate the image.

As a result, the generation unit can generate an image by applying an image filter that corresponds to the clarity to the entire image of the virtual space that is displayed on the screen by the display unit. In other words, it is possible to make the clarity of the entire image the same. For example, when the clarity of the entire image is low, the user notices that he/she is standing at a position far from the detection unit, and will move closer to the detection unit.

In the game device of the present invention, the generation unit can generate the image by drawing the object at a size that corresponds to the determined clarity.

In other words, the generation unit can draw the object that is displayed on the screen by the display unit large or small depending on the position where the user is standing. As a result, when the size of the object on only the right side of the user is small, for example, the user recognizes that his/her position is too far to the left of the detection unit, and moves to the center of the detection unit. Moreover, when the size of all of a plurality of objects that are displayed is large, the user recognizes that he/she is standing at a position close to the detection unit, and moves further away from the detection unit. When the position where the user is standing is very far from the detection unit, it is possible to not draw an image of the object.

In the game device of the present invention, the generation unit can generate the image by drawing the object at a position that corresponds to the determined clarity.

In other words, the generation unit changes the position of the object that is displayed on the screen according to the position where the user is standing, and draws the image. As a result, when the object to the right of the user is located far back in the virtual space, for example, the user recognizes that he/she is too far to the left of the detection unit, and moves toward the center of the detection unit.

In order to accomplish the object of the present invention above, the game control method according to a second aspect of the present invention is a game control method that is executed by a game device comprising a detection unit, an acquisition unit, a generation unit and a display unit, and comprises a detection step, an acquisition step, a generation step and a display step.

In the detection step, the detection unit detects the position of a user in real space.

In the acquisition step, the acquisition unit determines clarity that is correlated with the detected position of the user.

In the generation step, the generation unit generates an image that expresses the state of an object placed in virtual space that is drawn with the clarity determined for that object.

In the display step, the display unit displays the generated image on a screen.

In order to accomplish the object of the present invention above, the computer readable non-temporary information recording medium on which a program is recorded according to a third aspect of the present invention causes a computer to execute the steps of the game control method above. That information recording medium causes a computer to function as:

a detection unit that detects the position of a user in real space;

an acquisition unit that determines clarity that is correlated with the detected position of the user;

a generation unit that generates an image that expresses the state of an object placed in virtual space that is drawn with the clarity determined for the object; and a display unit that displays the generated image on a screen.

The information recording medium of the present invention can record a program as a computer readable non-transitory information recording medium such as a compact disk, a flexible disk, a hard disk, a magneto-optical disk, a digital video disk, a magnetic tape, a semiconductor memory and the like.

The program can be distributed and sold via a computer communication network independently from the computer that executes the program. The information recording medium can also be distributed and sold independently from the computer.

With the present invention, it is possible to provide a game device, a game control method and a computer readable non-transitory information recording medium with a program recorded thereon that are suitable for adjusting the standing position of a user in real space in a game that reproduces the movement of the user in real space in virtual space.

BRIEF DESCRIPTION OF THE DRAWINGS

A more complete understanding of this application can be obtained when the following detailed description is considered in conjunction with the following drawings, in which.

DETAILED DESCRIPTION

In the following, an embodiment of the present invention will be explained. In the following explanation, in order to make the explanation easier to understand, an embodiment of applying the invention to an information processing device for a game will be explained. The embodiments explained below are for explanation, and do not limit the range of the present invention. Therefore, it is possible for one skilled in the art to employ embodiments wherein all or some of the elements are replaced with equivalent elements; and those embodiments are also included within the scope of the present invention.

Embodiment

Figure 1:
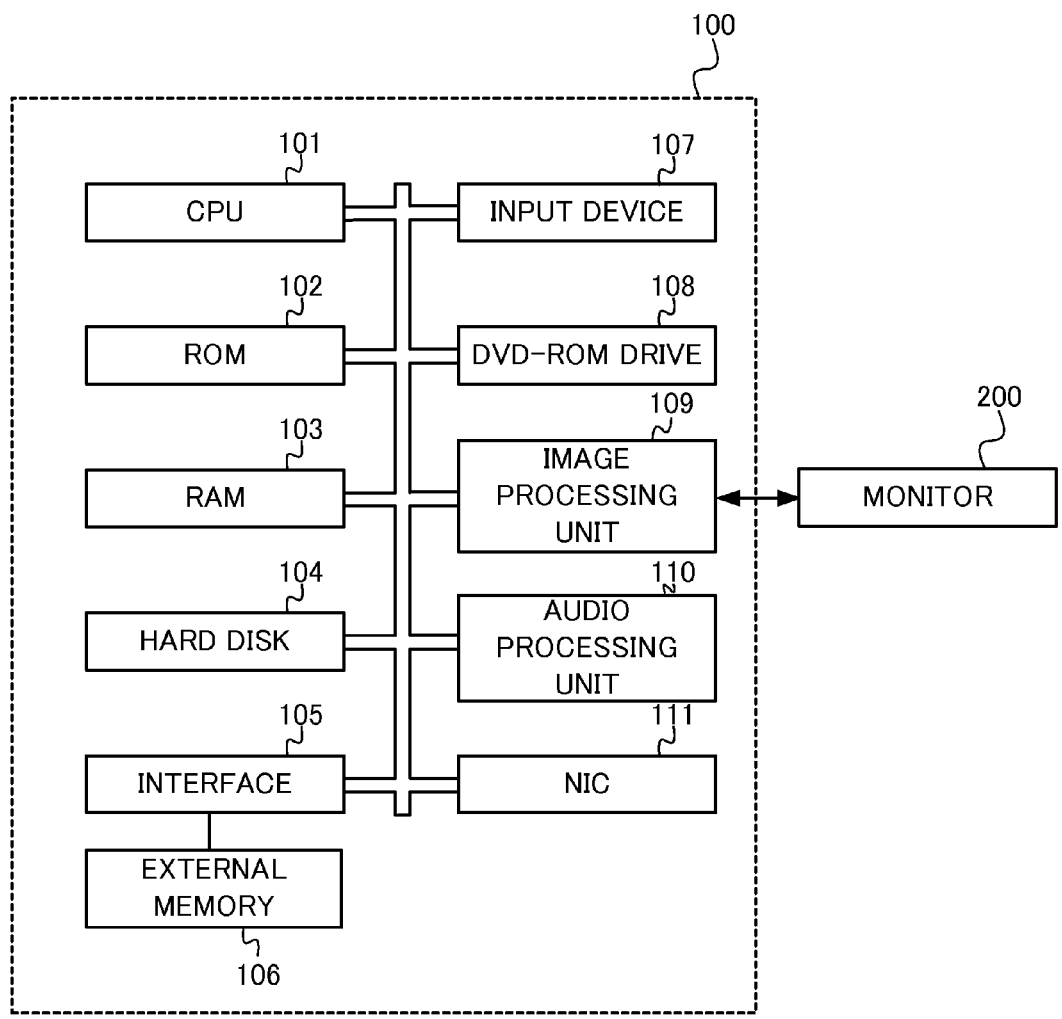
FIG. 1 is a schematic diagram illustrating the basic construction of a typical information processing device that makes possible the game device of an embodiment of the present invention.

In the following, an information processing device 100 of an embodiment of the present invention will be explained with reference to FIG. 1.

The information processing device 100 for a game comprises: a CPU (Central Processing Unit) 101, a ROM (Read Only Memory) 102, a RAM (Random Access Memory) 103, a hard disk 104, an interface 105, an external memory 106, an input device 107, a DVD-ROM (Digital Versatile Disc-Read Only Memory) drive 108, an image processing unit 109, an audio processing unit 110 and a NIC (Network Interface Card) 111.

By mounting a DVD-ROM, on which a game program and data are recorded, in the DVD-ROM drive 108, and turning ON the power to the information processing device 100, the program is executed, making possible the game device of this embodiment of the present invention.

The CPU 101 is connected to all of the component elements of the information processing device 100, and exchanges control signals and data with each of the connected elements. The CPU 101 uses an ALU (Arithmetic Logic Unit) on high-speed accessible memory areas called registers to perform arithmetic operations such as addition, subtraction, division and multiplication, logical operations such as a logical OR, logical AND or logical NOT operations, and bit operations such as a bitwise OR, bitwise AND, bit inversion, bit shift or bit rotation. Furthermore, the CPU 101 comprises a coprocessor that is capable of performing saturation calculations such as addition, subtraction, multiplication and division, or vector calculations such as trigonometric functions at high speed in order to correspond to multimedia processing.

An IPL (Initial Program Loader) that is executed immediately after the power is turned ON is stored in the ROM 102. By the CPU 101 executing this IPL, the program that is recorded on the DVD-ROM is read to the RAM 103, and the CPU 101 begins to execute the program.

The RAM 103 is for storing data and programs; for example, the program and data read from the DVD-ROM, as well as other data necessary for the progression of the game are stored in the RAM 103. An area for variables is provided in the RAM 103, and the CPU 101 performs processing such as directly using the ALU to perform operations on the values stored in that variable area. After values that are stored in the RAM 103 are stored in a register, the CPU 101 performs operations on that register, and rewrites the operation results in memory.

The hard disk 104 stores the program for the operating system (OS) and various game data that are necessary for overall control of the operation of the information processing device 100. The CPU 101 can constantly rewrite the information that is stored on the hard disk 104.

An external memory 106 that is removable is connected to the interface 105. Data that indicate the status of play of the game, for example, the past scores, and data that indicate the progression status of the game, are stored in the external memory 106. The CPU 101 can constantly rewrite the information that is stored in the external memory 106.

Figure 2:
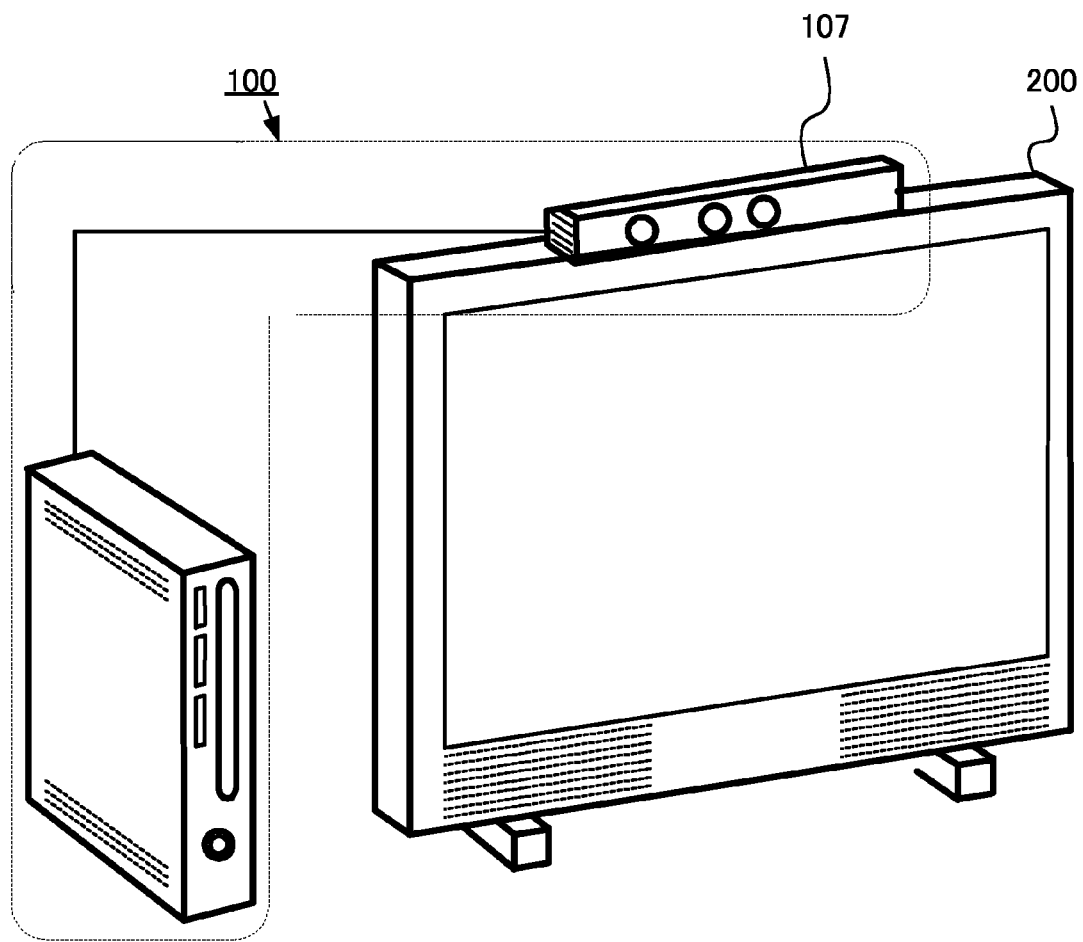
FIG. 2 is a drawing of the external appearance of an input device and a monitor of a typical information processing device that makes possible the game device of an embodiment of the present invention.

The input device 107, as illustrated in FIG. 2, is located on top of the monitor 200 on which the game screen is displayed. The input device 107 comprises a camera that takes images of the movement of the user. The CPU 101 analyzes the image data that expresses the images taken by the camera, and determines parts of the user, such as the user's hands, feet and the like, that are included in the image. The method used for analyzing the image includes analysis by pattern recognition, analysis by extraction of characteristic points, analysis by calculation of the spatial frequency and the like. The camera continuously takes image during the game.

The input device 107 comprises a distance sensor that measures the distance from the input device 107 to the user. The input device 107 irradiates infrared light on the surroundings, and detects the reflected waves of this infrared light. The input device 107 then, based on the phase difference between the irradiated waves and the reflected waves, or based on the time from when the infrared light is emitted until the reflected light is detected (progression time), finds the distance from the emission port of the irradiated waves to the object that reflects the irradiated waves. Detection of the distance by a distance sensor is repeatedly performed at specified time intervals in all directions that the infrared light can be emitted.

From the distance sensor, the information processing device 100 is able to know in more detail the three-dimensional position and shape of an object that is located in real space. For example, suppose that the CPU 101 performs image analysis on first image data that was acquired at a first time, and second image data that was acquired at a second time, then from the result determines that the head of the user is included in both the first image data and the second image data. In this case, from the change in the position of the head in the first image data and the position of the head in the second image data, the CPU 101 determines in which direction, up, down, left or right, and how much the head of the user has moved as seen from the camera. Furthermore, from the change in the distance to the head in the first image data and the distance to the head in the second image data, the CPU 101 determines which direction, front or back, and how much the head of the user has moved as seen from the camera (how much the head has moved closer to or further from the camera).

In this way, based on the images taken by the camera of the input device 107, and the distance measure by the distance sensor of the input device 107, the information processing device 100 is able to digitize and know the three-dimensional movement of the user in real space.

For example, in a soccer game, supposing that the user performs the motion of kicking a ball in front of the monitor 200 screen (in front of the input device 107), the CPU 101 recognizes that the user has performed a motion of kicking the ball. The CPU 101 then proceeds with the game according to the recognized motion. In other words, the user is able to input desired instruction by moving his/her own body without having to hold a controller or the like.

A program for making a game possible, and image data and audio data for the game are recorded on a DVD-ROM that is mounted in the DVD-ROM drive 108. According to control from the CPU 101, the DVD-ROM drive 108 reads the program and data recorded on the mounted DVD-ROM. The CPU 101 then temporarily stores the read program and data in the RAM 103 or the like.

After the CPU 101 or an image operation processor of the image processing unit 109 performs processing of the data read from the DVD-ROM, the image processing unit 109 records the result in a frame memory of the image processing unit 109. The image information that is recorded in the frame memory is converted to a video signal at specified synchronized timing, and outputted to the monitor 200 that is connected to the image processing unit 109. In this embodiment, the entire image that is displayed on the monitor 200 in this way is called an image in virtual space, and all of the elements that make up this virtual space and that are displayed in the image in virtual space are called objects.

The image operation processor of the image processing unit 109 can execute permeation operations such as superimposing of 2-dimensional images, cc blending or the like, or various saturation operations. The image operation processor can also perform operation using the Z-buffer method to render polygon information that is arranged in virtual 3-dimensional space and to which various texture information is added in order to obtain a rendered image that looks down in the specified direction of the sight line on polygons arranged in virtual 3-dimensional space from a specified viewpoint.

Furthermore, by working together, the CPU 101 and image operation processor can draw text sequences to the frame memory as a 2-dimensional image according to font information that defines the text character shapes, and can draw that text on each polygon surface.

By writing the image data that were stored beforehand on the DVD-ROM to the frame memory of the image processing unit 109, the CPU 101 and image operation processor display the game status on the screen. By repeatedly performing this kind of processing at periodic timing (typically, at vertical sync interrupt (VSYNC) timing), animation is displayed on the monitor 200.

The audio processing unit 110 converts audio data that is read from a DVD-ROM to an analog audio signal, and that analog audio signal is outputted from a speaker. Moreover, the audio processing unit 110, according to control by the CPU 101, creates audio data such as sound effects or music to be generated during play of a game, and by decoding the created audio data, causes various sounds to be outputted from a speaker.

The NIC 111 connects the information processing device 100 to a computer network such as the Internet. The NIC 111 comprises a modem that complies with the 10BASE-T/100BASE-T standards that are used in a LAN (Local Area Network), a cable modem for connecting to the Internet using a cable television line and the like, and an interface that functions as a go-between between the modem and the CPU 101.

Figure 3:
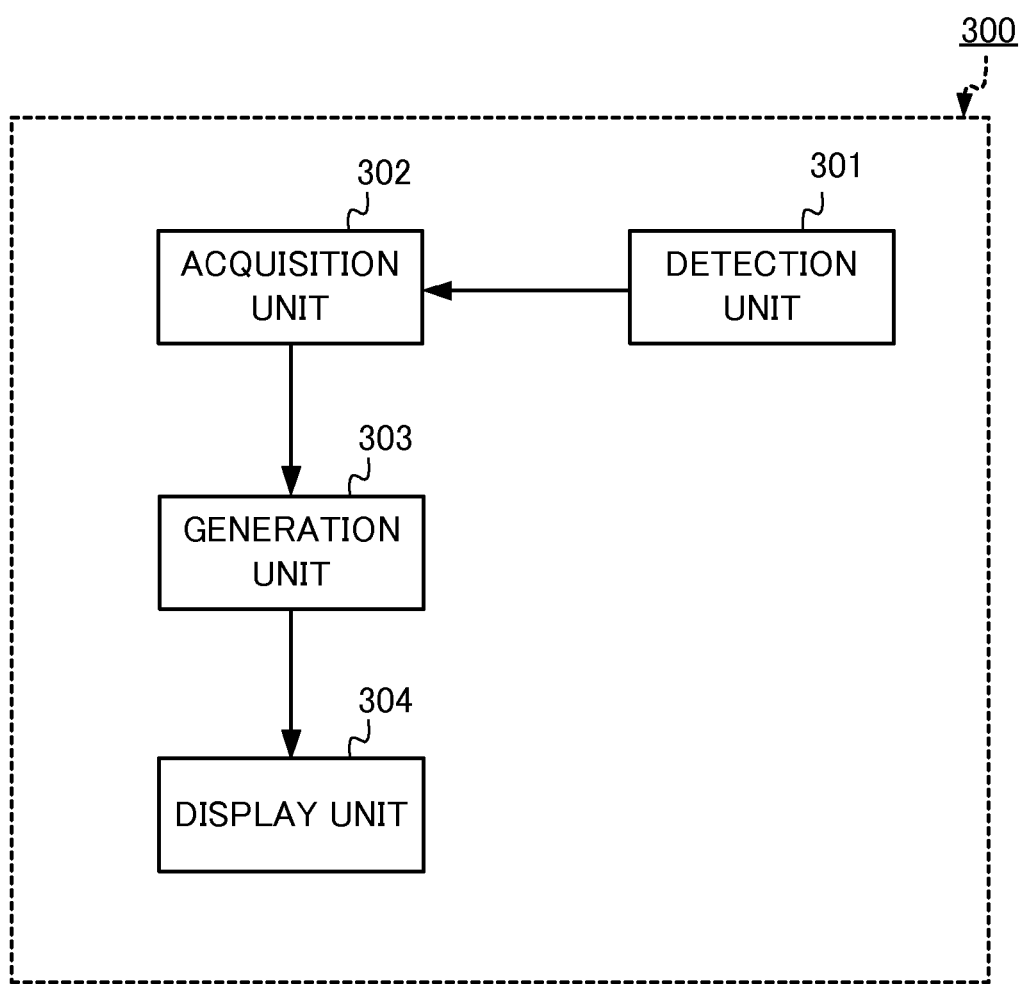
FIG. 3 is a block diagram illustrating the basic construction of a game device of an embodiment of the invention.

Next, the functional construction of the game device 300 of this embodiment that is made possible by an information processing device 100 having the construction described above will be explained with reference to FIG. 3.

The game device 300 comprises a detection unit 301, an acquisition unit 302, a generation unit 303 and a display unit 304.

The detection unit 301 detects the position of the user in real space. More specifically, when the user stands in front of the input device 107, as described above, the input unit 107 detects the distance and direction from the input device 107 to the user.

In other words, the function of the detection unit 301 is made possible by the input device 107, and the detection unit 301 outputs the detected position to the acquisition unit 302.

The acquisition unit 302 determines the clarity that is correlated with the detected position of the user. Here, the clarity expresses the degree of how easy it is to see the image that is displayed on the monitor 200. The clarity includes all elements that cause the image to change such as the color of the image, the thickness of the lines of an image, shading, and magnification rate of the size of the objects inside the image; however, in this embodiment, the clarity is defined as the magnification rate of the size of the objects inside the image.

Moreover, in this embodiment, in an image taken by the detection unit 301 (input device 107), correlation is such that the clarity becomes lower the further the position where the shape of the user is located and size of that shape is separated from a specified reference position and reference size. This will be explained with reference to the graphs of FIG. 4A and FIG. 4B. In graphs 400 and 401, the horizontal axis represents the position of the user from the input device 107, and the vertical axis represents the clarity of the image.

Figure 4A:
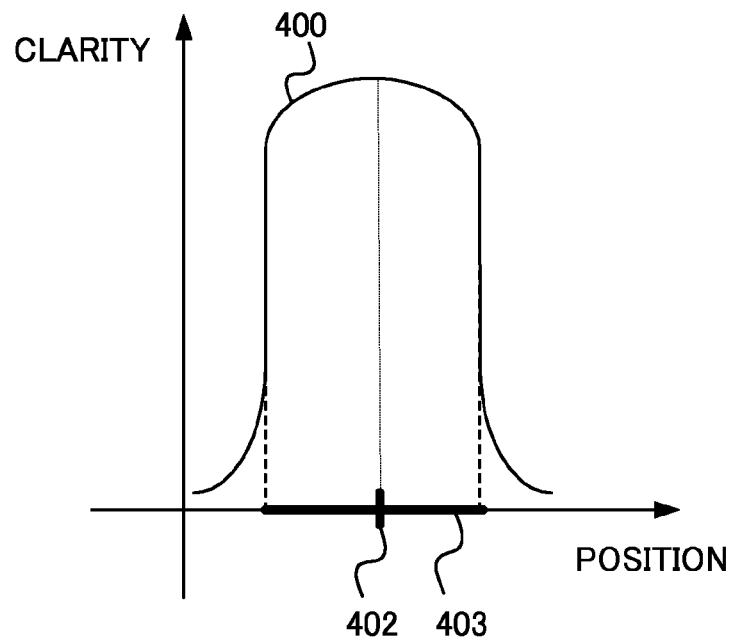
FIG. 4A is a graph illustrating the relationship between the position from the input device to the user and the clarity.

As illustrated in FIG. 4A, when the user is at a position 402, the clarity is at its highest. In other words, the position 402 is the location where it is possible for the input device 107 to take an image of the user with the best precision, and the position and size of the shape of the user in an image taken at this position is the specified reference position and specified reference size.

Even when the user is within the range 403 centered around the position 402, the input device 107 is able to take an image of the user with a certain amount of good precision. Therefore, preferably the rate of change in the clarity within the range 403 is small. That is, even when the user is at a position that is a little separated from the position 402, maintaining high clarity means that the game can proceed stably.

Furthermore, the clarity is such that it drops greatly when the user moves outside of the range 403. This makes it possible for the user to easily know that he/she has moved away from the proper position, and can quickly correct the position.

Figure 4B:
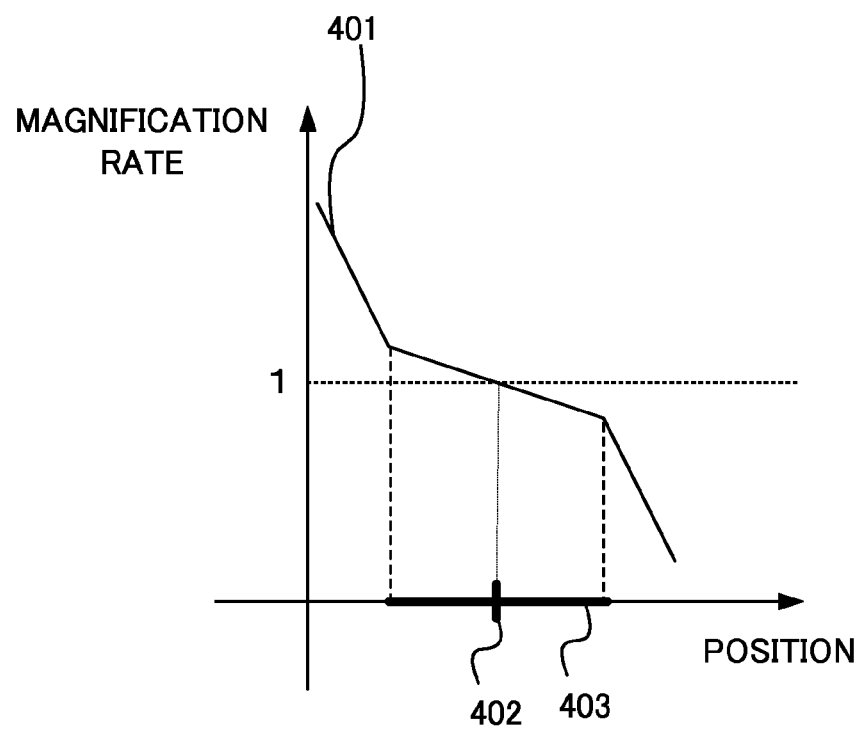
FIG. 4B is a graph illustrating the relationship between the position from the input device to the user and the magnification rate.

FIG. 4B is a graph in the case where clarity is defined as the magnification rate of the size of an object. When the user is at the position 402, the magnification rate of the object is taken to be "1".

In the case of FIG. 4A, the clarity drops when the user moves outside the range 403, regardless of the distance of the position to the input device 107. However, in the case of FIG. 4B, when the user is separated from the position 402 and the distance from the input device 107 to the position of the user is close, the magnification rate becomes greater than "1", and when the distance is far, the magnification rate becomes less than "1". The change in the magnification rate becomes large outside of the range 403. In other words, this is based on the opinion that as the object is reduced in size, it become difficult to see, so the clarity becomes low, and when the object is magnified too much, it becomes difficult for the user to catch the entire object and it becomes difficult to see, so that the clarity becomes low.

The generation unit 303 applies an image filter (in this embodiment, a size change filter) that corresponds to the clarity of the object that was determined by acquisition unit 302, and generates an image that expresses the state of the virtual space where the object is located. More specifically, the image is generated by the image processing unit 109. It is possible to generate not only an image of the overall virtual space, but also individual images of objects in virtual space.

The display unit 304 displays the image that was generated by the generation unit 303 on the monitor 200. More specifically, the image processing unit 109 outputs the image to the monitor 200.

Here, the image generated by the generation unit 303 will be explained in detail with reference to the drawings.

Figure 5A:
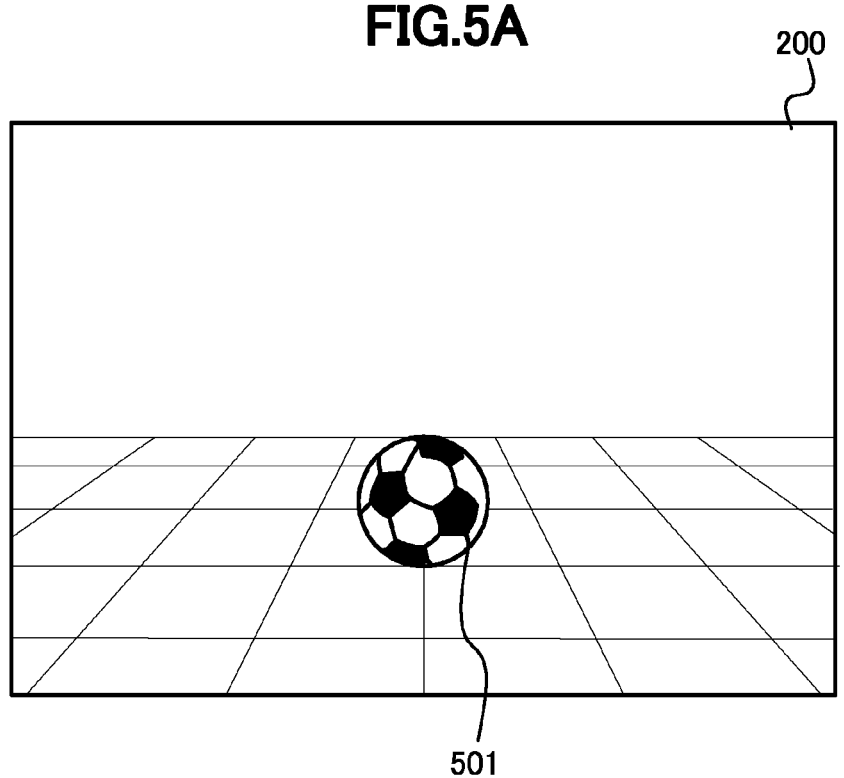
FIG. 5A is a screen of a monitor on which an object is displayed when the user is at a proper position.
Figure 5B:
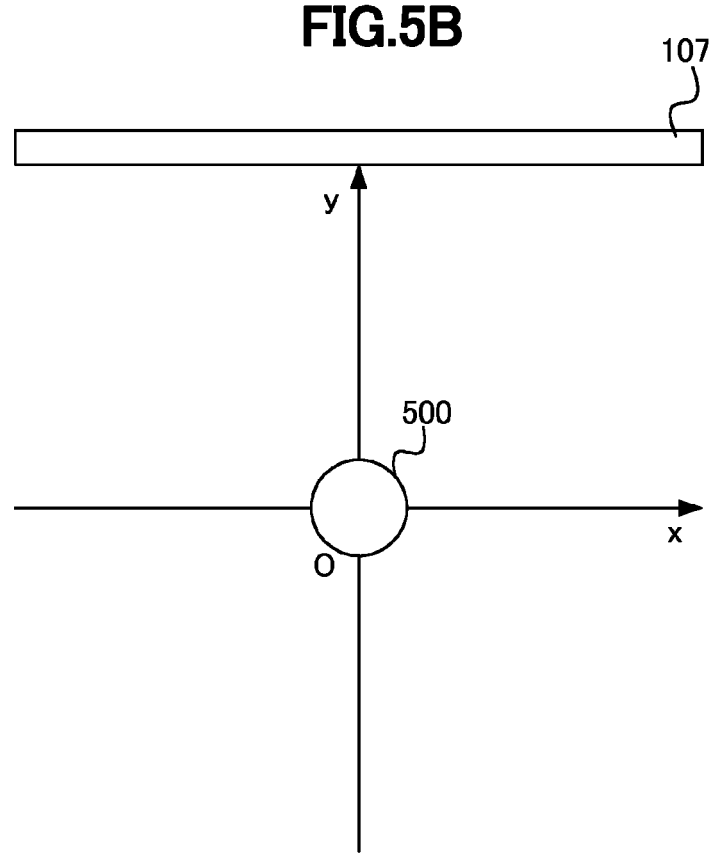
FIG. 5B is a diagram illustrating the positional relationship between the user at that time and the input device.

FIG. 5B illustrates the case were the user 500 is at the position O (0, 0), and is the position at which the game can be played most comfortably. In other words, position O corresponds to the position 402 in FIG. 4A and FIG. 4B. Position O is at a position that corresponds to the center section of the input device 107. The X-axis in FIG. 5B is parallel with the input device 107 (in other words, the screen of the monitor 200) and the Y-axis is perpendicular to the input device 107.

When the user 500 is at position O, as illustrated in FIG. 5A, an object 501 that is displayed on the monitor 200 (a soccer ball in this embodiment) is at a size that is most recognizable by the user 500. Playing the game in this state is most preferable.

Figure 6A:
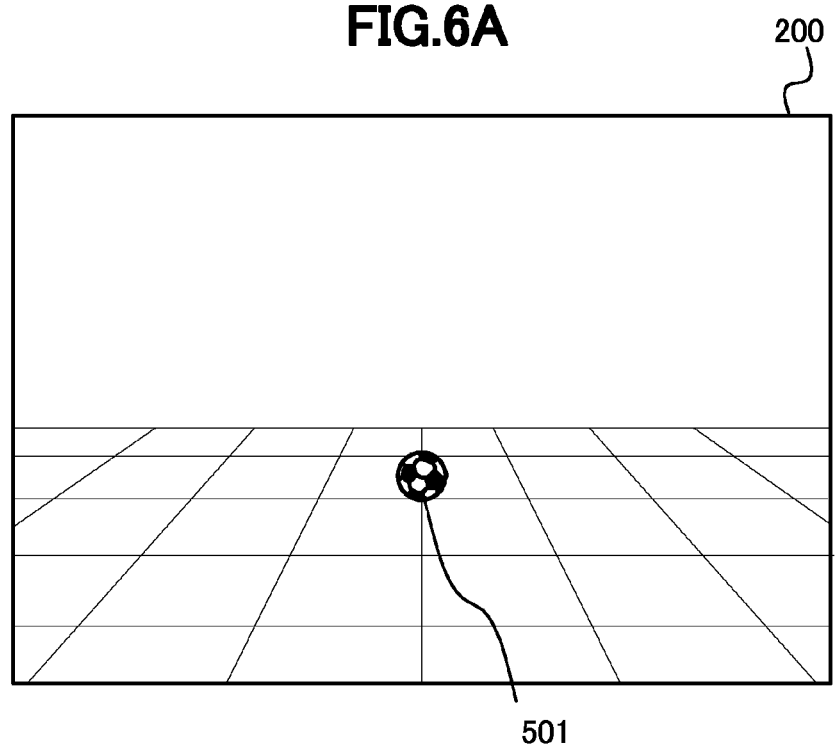
FIG. 6A is a screen on a monitor on which an object is displayed when the user is at a position further from the input device than the proper position.
Figure 6B:
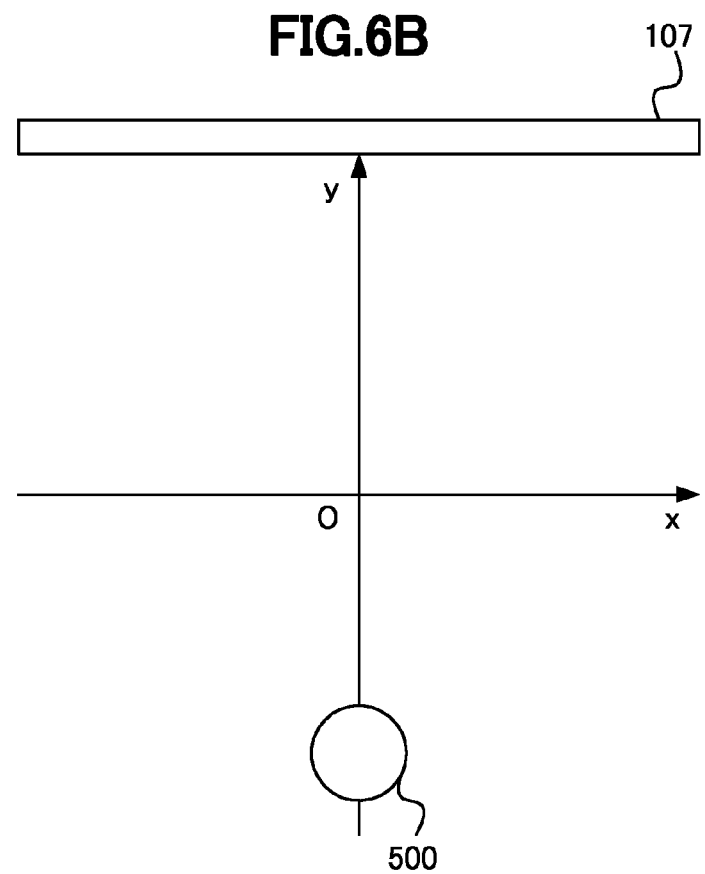
FIG. 6B is a diagram illustrating the positional relationship between the user at that time and the input device.

However, as the game is continued, the user 500 moves from position O, and as illustrated in FIG. 6B, may move further from the input device 107. In this case, the detection unit 301 detects the position of the user 500, and outputs that position to the acquisition unit 302. The acquisition unit 302 checks how far the user is from the position O, and based on the graph 400 in FIG. 4A, determines the clarity that corresponds to that position, and in this embodiment, based on the graph 401 in FIG. 4B, determines the magnification rate.

When the user 500 moves away from the input device 107 as in FIG. 6B, the clarity becomes lower than the state illustrated in FIG. 5B, or in other words, the magnification rate of the object 501 becomes small. The generation unit 303 generates an image of the object 501 having a small size as illustrated in FIG. 6A, and the display unit 304 displays that image on the monitor 200.

In this state, the object 501 becomes difficult for the user 500 to see, and the game becomes more difficult to play. Therefore, the user 500, on his/her own initiative, moves to a position where it is easier to see by moving closer to the input device 107. As a result, the object 501 is once again displayed properly as illustrated in FIG. 5A, and the game becomes easier for the user 500 to play.

Figure 7A:
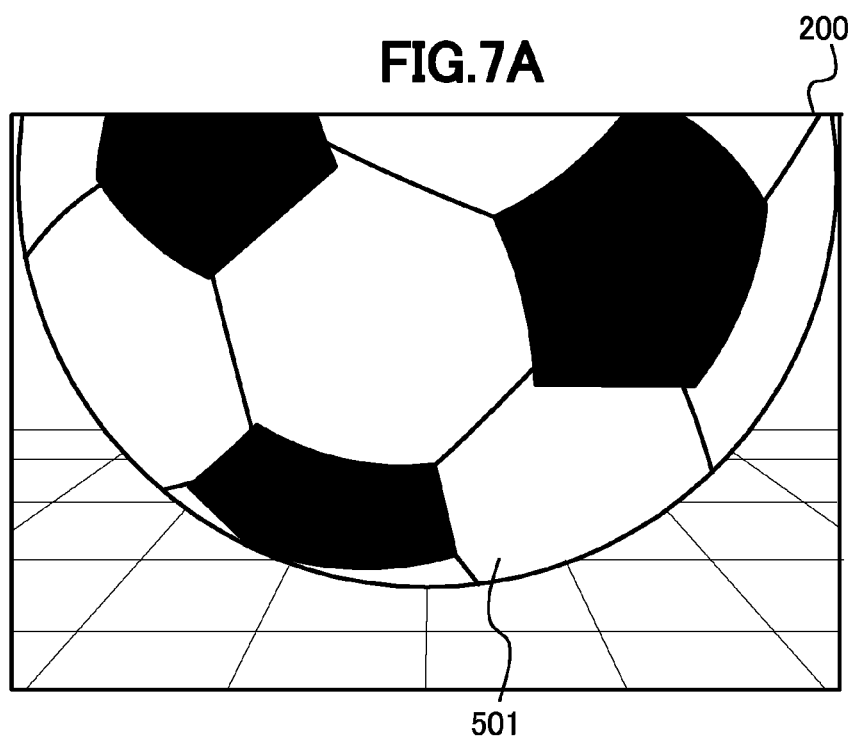
FIG. 7A is a screen on a monitor on which an object is displayed when the user is at a position nearer to the input device than the proper position.
Figure 7B:
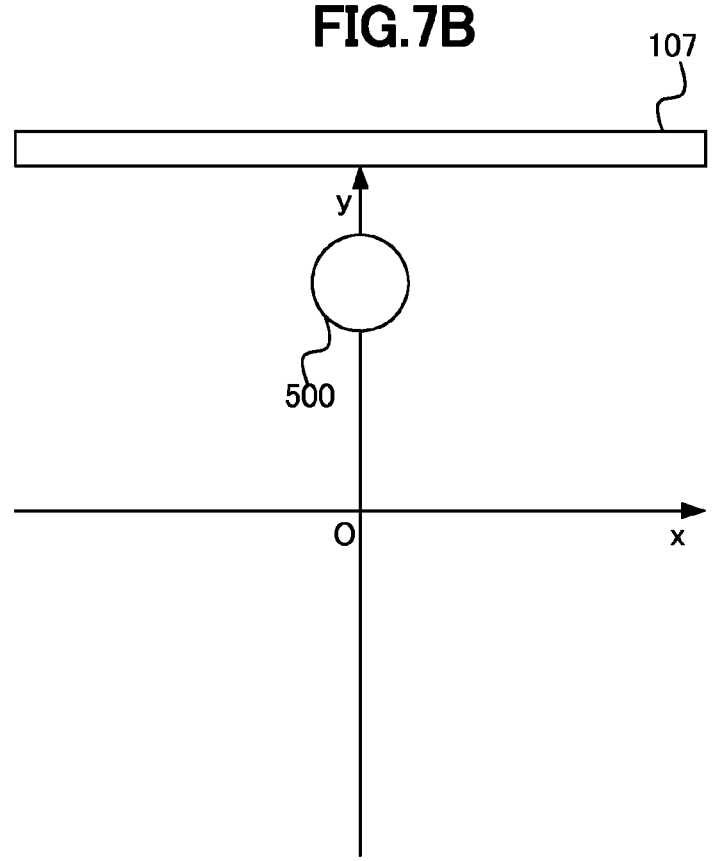
FIG. 7B is a diagram illustrating the positional relationship between the user at that time and the input device.

As the game continues, the user 500 may move from the position O, and as illustrated in FIG. 7B, may become too close to the input device 107. When this happens, the detection unit 301 detects the position of the user 500 and outputs that position to the acquisition unit 302. The acquisition unit 302 checks how far the user is from the position O, and determines the magnification rate based on the graph 401 in FIG. 4B.

When the user 500 comes close to the input device 107 as illustrated in FIG. 7B, the clarity becomes less than the state illustrated in FIG. 5B, and the magnification rate becomes large. The generation unit 303, generates an image of the object 501 having a very large size as in FIG. 7A, and the display unit 304 displays that image on the monitor 200.

In this state, the object 501 becomes too large and it is difficult for the user 500 to see the entire image, and thus it becomes difficult to play the game. Therefore, the user 500 moves, on his/her own initiative, to a position where it becomes easier to see by moving further from the input device 107. As a result, the object 501 is once again displayed properly as illustrated in FIG. 5A, and the game become easier to play.

Figure 8A:
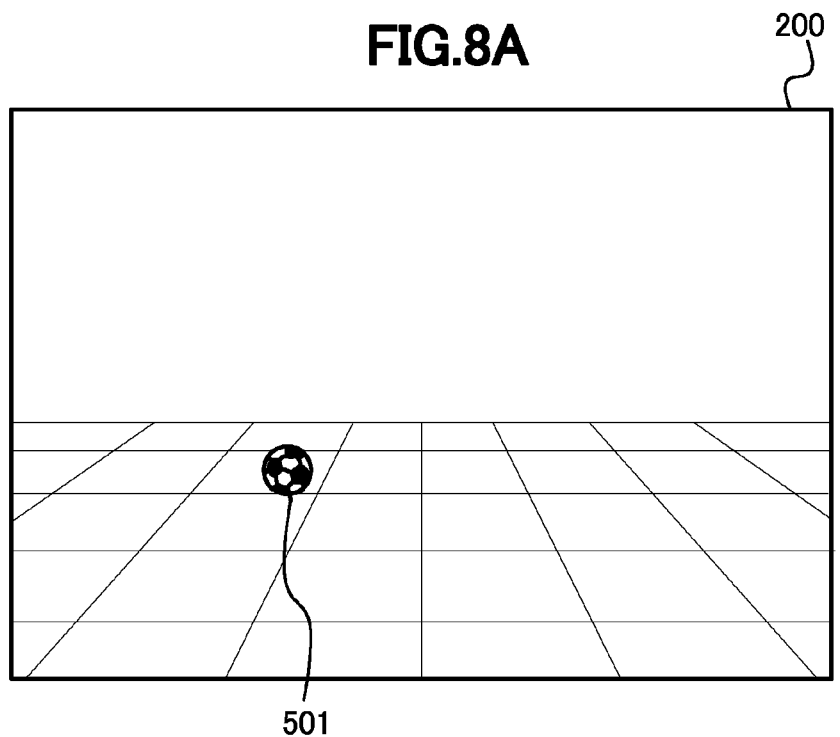
FIG. 8A is a screen on a monitor on which an object is displayed when the user is at a position to the right of the proper position.
Figure 8B:
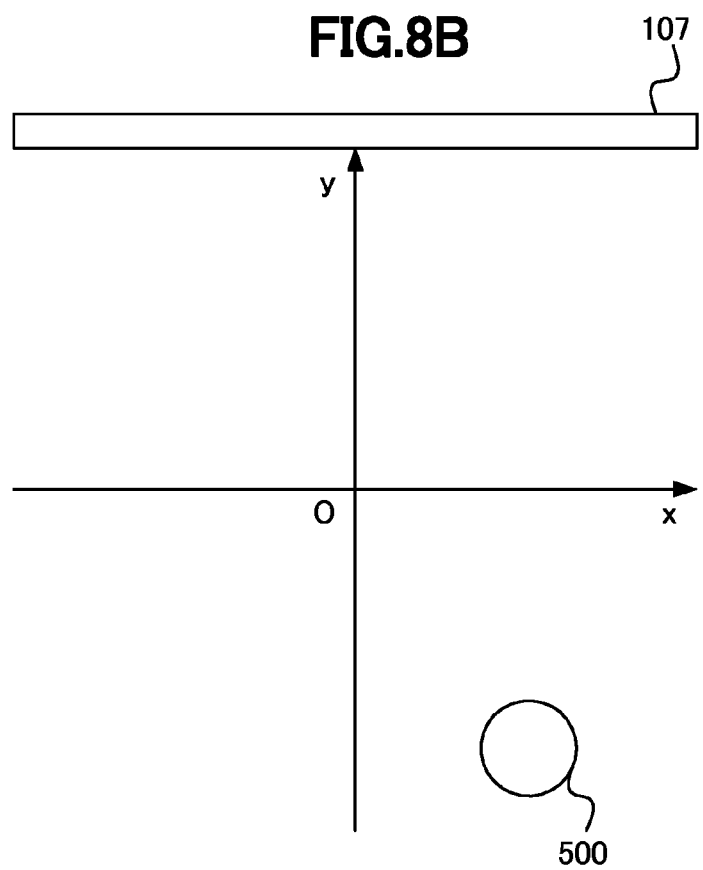
FIG. 8B is a diagram illustrating the positional relationship between the user at that time and the input device.

When the user 500 moves in the Y-axis direction in addition to moving in the X-axis direction as illustrated in FIG. 8B, the display becomes as illustrated in FIG. 8A. In this case, the size of the object 501 becomes smaller, and the position is shifted from the center of the monitor 200.

In this state, the object 501 is small and is moved from the center of the screen, so it becomes more difficult for the user 500 to play the game. Therefore, the user 500, on his/her own initiative, moves to a position where it is easier to see by moving closer to the input device 107, as well as moving to the proper position in the horizontal direction. As a result, the object 501 is displayed properly as illustrated in FIG. 5A, and the game becomes easier to play.

Next, the case of there being two objects will be explained with reference to the drawings.

Figure 9A:
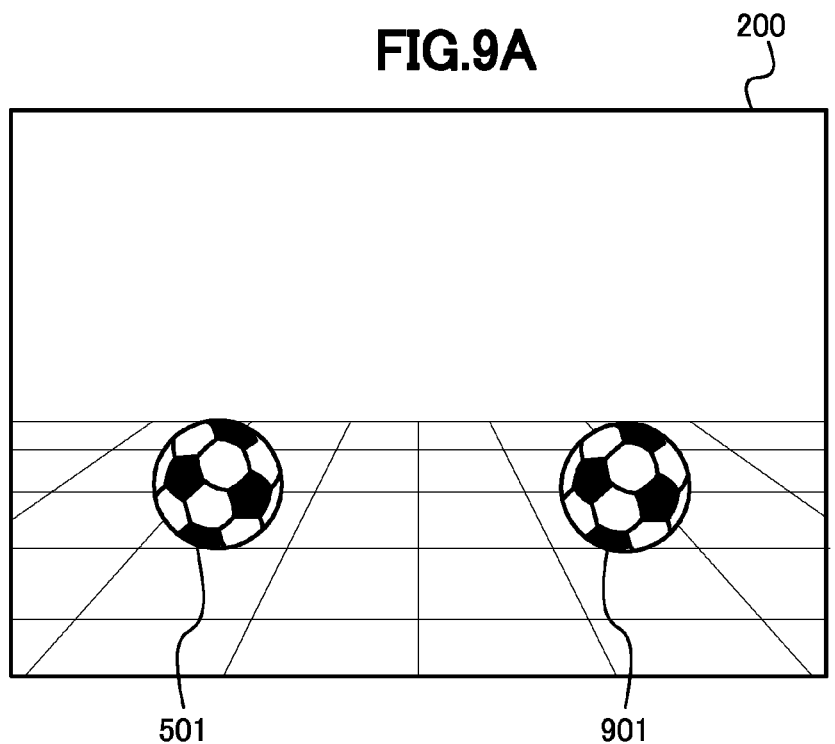
FIG. 9A is a screen on a monitor on which two objects are displayed when the user is at the proper position.
Figure 9B:
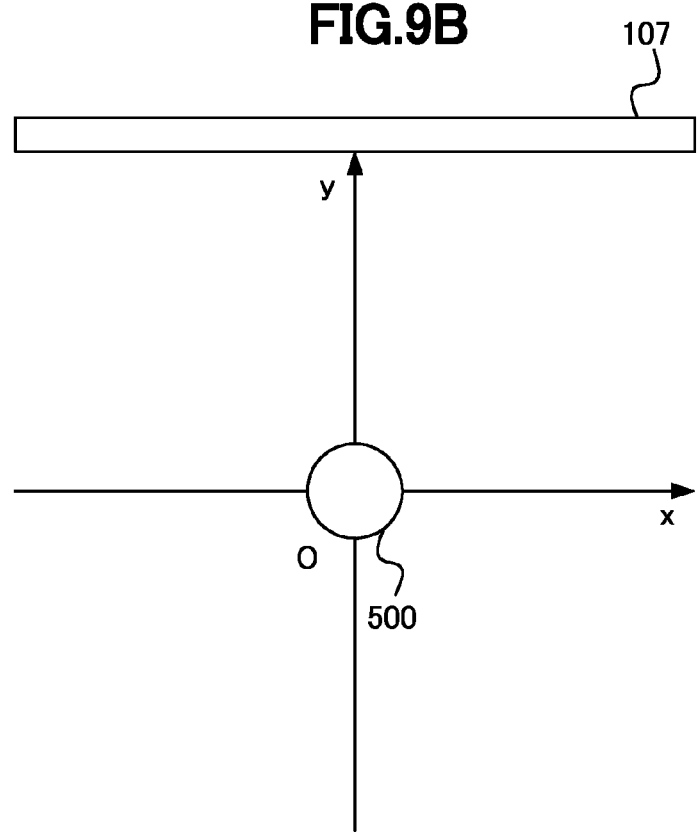
FIG. 9B is a diagram illustrating the positional relationship between the user at that time and the input device.

FIG. 9B, similar to FIG. 5B, illustrates the case where the user 500 is at a position O (0, 0), which is the position where the game can be played most comfortably. Here, as illustrated in FIG. 9A, two objects 501, 901 that are displayed on the monitor 200 are both at a size where they are easily recognizable, and playing the game in this state is most preferable.

Figure 10A:
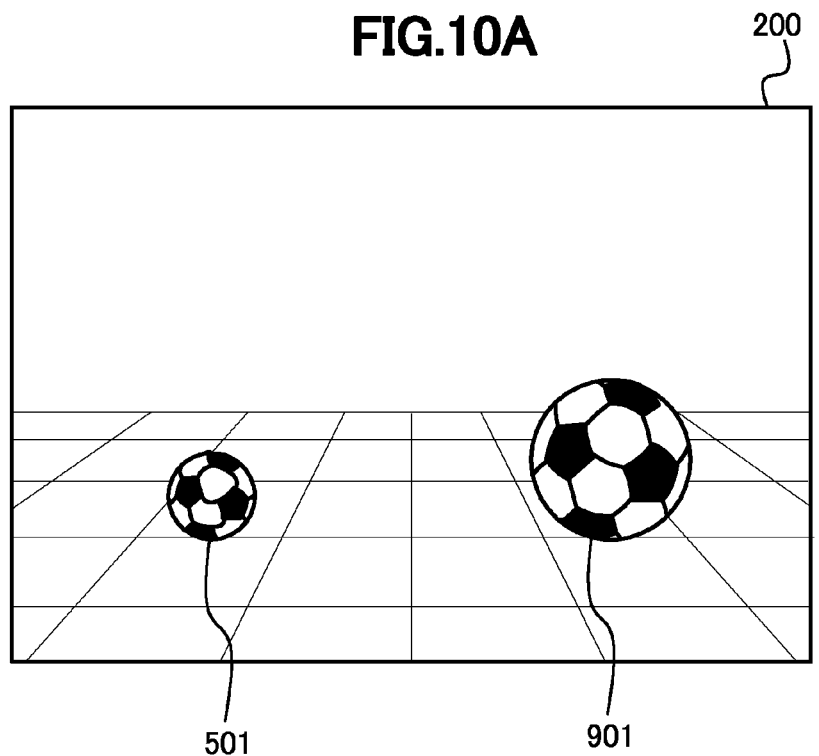
FIG. 10A is a screen on a monitor on which two objects are displayed when the user is at a position to the right of the proper position.
Figure 10B:
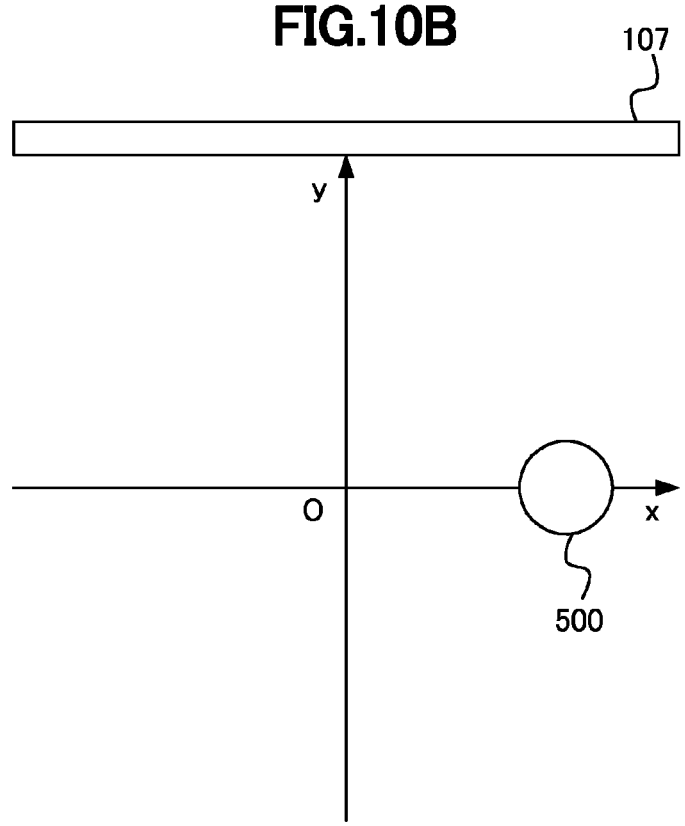
FIG. 10B is a diagram illustrating the positional relationship between the user at that time and the input device.

However, as the game is continued, the user 500 may move to the right from the position O as illustrated in FIG. 10B. When this happens, the display on the monitor 200 becomes as illustrated in FIG. 10A. This is because the object 901 becomes closer to the user 500. When compared with the display in FIG. 9A, the object 501 is displayed smaller, while at the same time, the object 901 is displayed larger. As a result, the user 500 is able to recognize that he/she is at a position to the right of the most suitable position, and moves to the left on his/her own initiative.

Figure 11A:
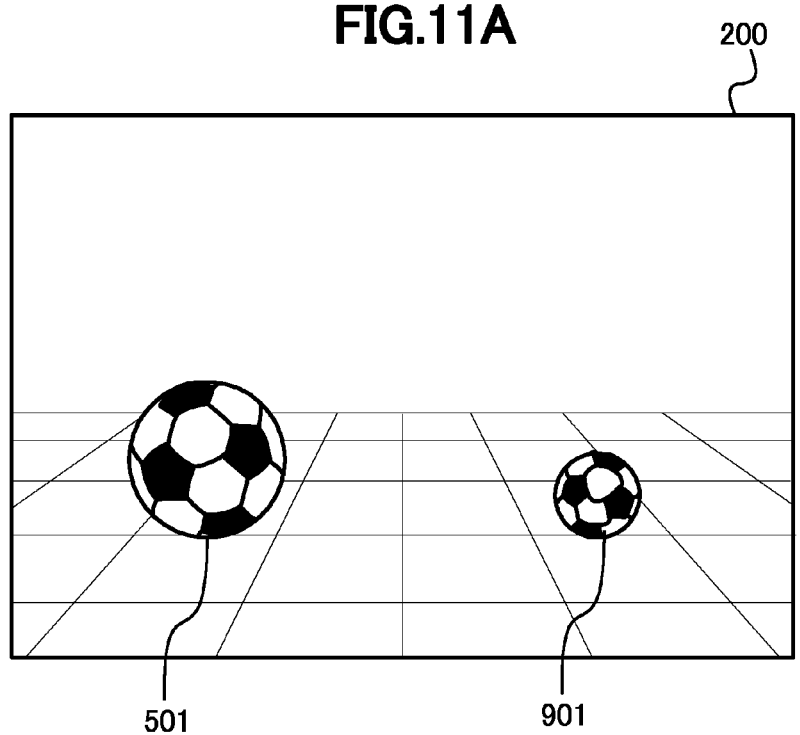
FIG. 11A is a screen on a monitor on which two objects are displayed when the user is at a position to the left of the proper position.
Figure 11B:
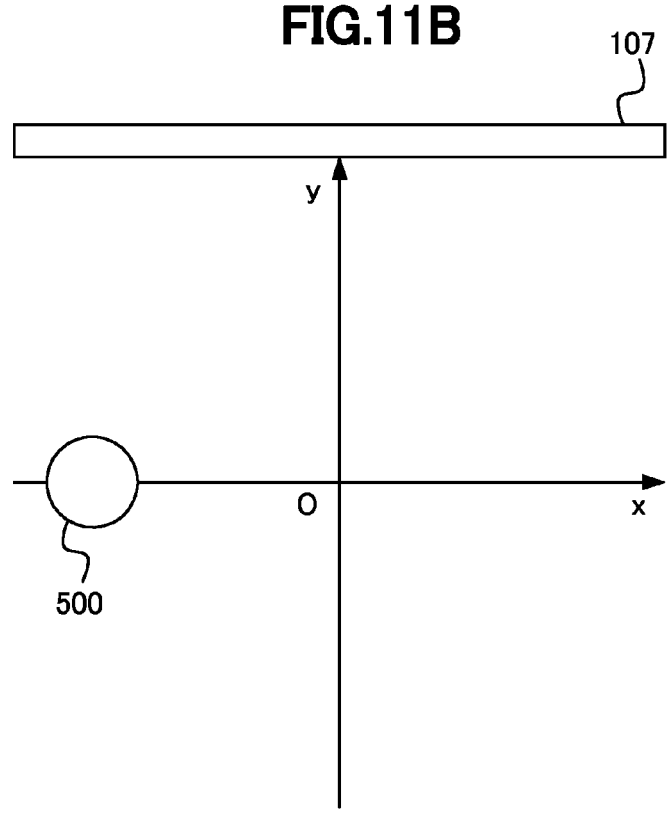
FIG. 11B is a diagram illustrating the positional relationship between the user at that time and the input device.

Moreover, as illustrated in FIG. 11B, when the user 500 moves to the left side of the position O, the display on the monitor 200 becomes as illustrated in FIG. 11A. This is because the object 501 is closer to the user 500. When compared with FIG. 9A, the object 501 is displayed larger, while at the same time, the object 901 is displayed smaller. As a result, the user 500 recognizes that he/she is at a position to the left of the proper position, and on his/her own initiative, moves to the right.

As explained above, the case of there being one object, and the case of there being two objects were explained; however, in the case of there being three or more objects as well, the fact that the magnification rate becomes smaller as the user 500 moves further away, and the magnification rate becomes larger as the user 500 moves closer is the same.

Figure 12:
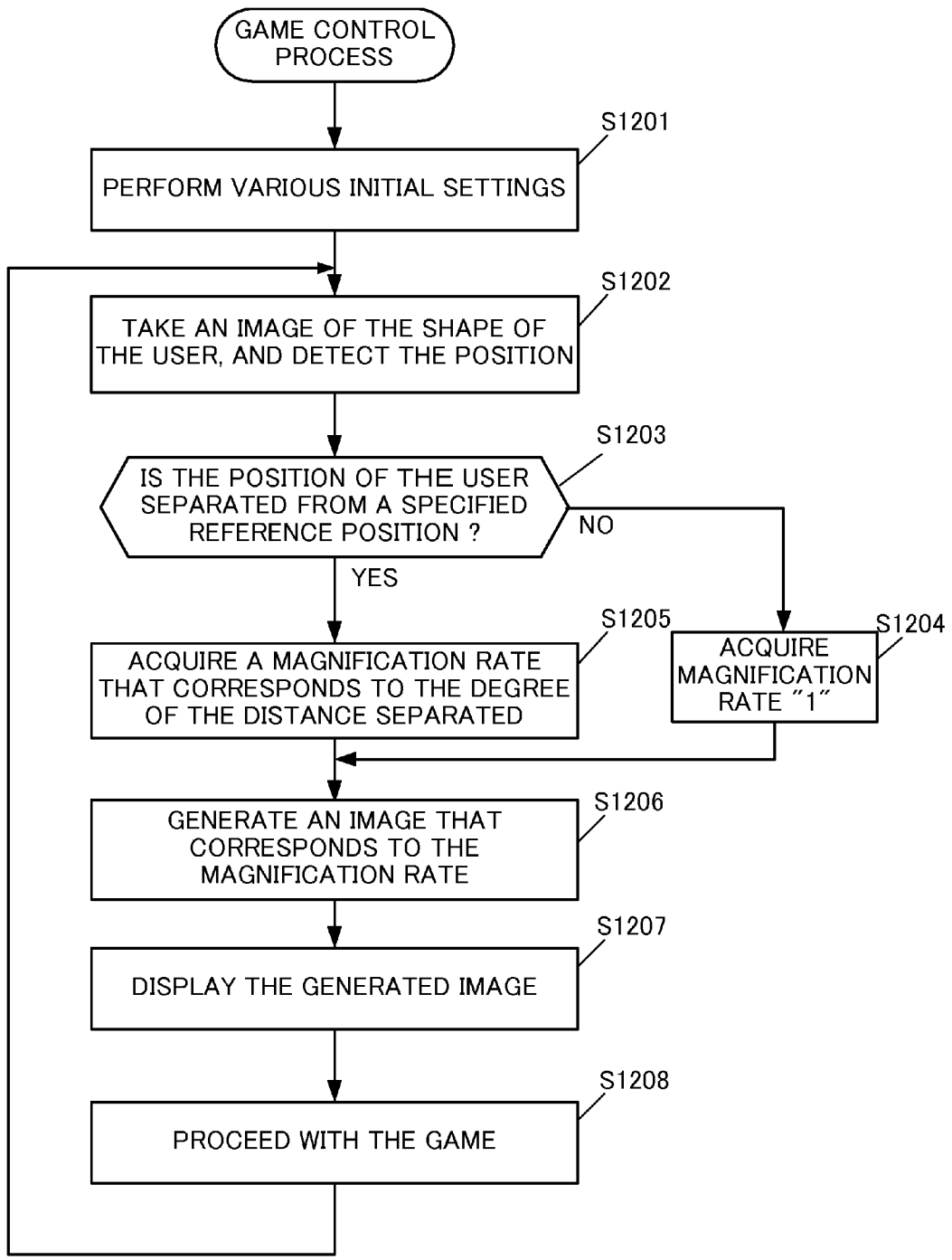
FIG. 12 is a flowchart illustrating the flow of game control process by a game device of an embodiment of the invention.

An example of the processing by the game device 300 explained above will be explained with reference to the flowchart illustrated in FIG. 12.

First, the power to the information processing device 100 is turned ON, after which the CPU 101 reads the program from the RAM 103 and sets the position and posture of the object 501 in virtual space to the default values (step S1201).

After initialization in step S1201, the detection unit 301 controls the input device 107, takes an image of the user 500 in real space and detects the position of the user 500 (step S1202).

After the detection unit 301 detects the position of the user 500 in step S1202, the acquisition unit 302 determines the position of the user 500 from the detection unit 301 and determines whether or not the position of the user 500 is separated from the reference position (position O above) (step S1203).

When the user 500 is not separated from the reference position (step S1203: NO), the acquisition unit 302 sets the magnification rate of the object 501 to "1" (step S1204). In other words, when the user 500 is not separated from the reference position, the user 500 is at the proper position, so that it is necessary to clearly display the object 501. After the magnification rate has been acquired, processing moves to step S1206 in order to generate an image of the object 501.

When the user 500 is separated from the reference position (step S1203: YES), the acquisition unit 302 determines the magnification rate of the object 501 based on the graph 401 in FIG. 4B, or in other words, according to the ratio that the user 500 is separated from the reference position (step S1205). After acquiring the magnification rate, processing moves to step S1206 in order to generate an image of the object 501.

The generation unit 303 uses the magnification rate that was obtained from the acquisition unit 302 in step S1204 or step S1205, and generates an image of the object 501 according to that magnification rate (step S1206).

The display unit 304 takes in the image obtained from the generation unit 303 in step S1206 and displays that image on the monitor 200 (step S1207).

The user 500 proceeds with the game while changing his/her position on his/her own initiative in order that the clarity of the image on the monitor 200 that was displayed in step S1207 becomes high (step S1208). The detection unit 301 periodically detects the position of the user 500, so that the game device 300 repeats steps S1201 to S1208.

The game device 300 of this embodiment is set such that when the detection unit 301 (input device 107) and the position of the user 500 are in the most suitable position, the clarity becomes the highest (the magnification rate becomes "1"), so when the user 500 stands in a position with respect to the input device 107 that is not proper, the clarity becomes low. In that case, the generation unit 303 generates an image having low clarity, and the object 501 is displayed on the monitor 200 with low clarity. When the object 501 that is displayed on the monitor 200 is not clear, the user 500 is able to know whether his/her position is too close or too far from the input device 107.

Furthermore, in order that the object 501 can easily be seen, the user 500 naturally changes his/per position. In other words, the user 500 adjusts his/her position according to his/her own initiative, so that there is no feeling of being forced to adjust the position, and thus it is possible to become more deeply involved in the game.

Even when the position of the user 500 is not proper, the game is not stopped, and even though there are no warnings, the user 500 adjusts his/her position on his/her own initiative, so that the game is hindered very little. Therefore, there is no need to stop the game in order to adjust the position, and the user 500 is able to become more deeply involved in the game.

The clarity that is determined by the acquisition unit 302 can be such that it is changed only by the position of the user, or can be such that it is changed only by the size of the user. Furthermore, it is possible to change the clarity according to both the user's position and size.

(Variation)

The present invention is not limited to the embodiment described above, and various variations are possible.

For example, in the embodiment described above, construction is such that no warning is given even though the user 500 moves away from the proper position, and the user 500 is encouraged to adjust his/her position on his/her own; however, construction is also possible in which a warning is outputted when the user 500 moves a certain distance or greater from the proper position, for example, when the user is outside of the range 403 in FIG. 4A.

Figure 13A:
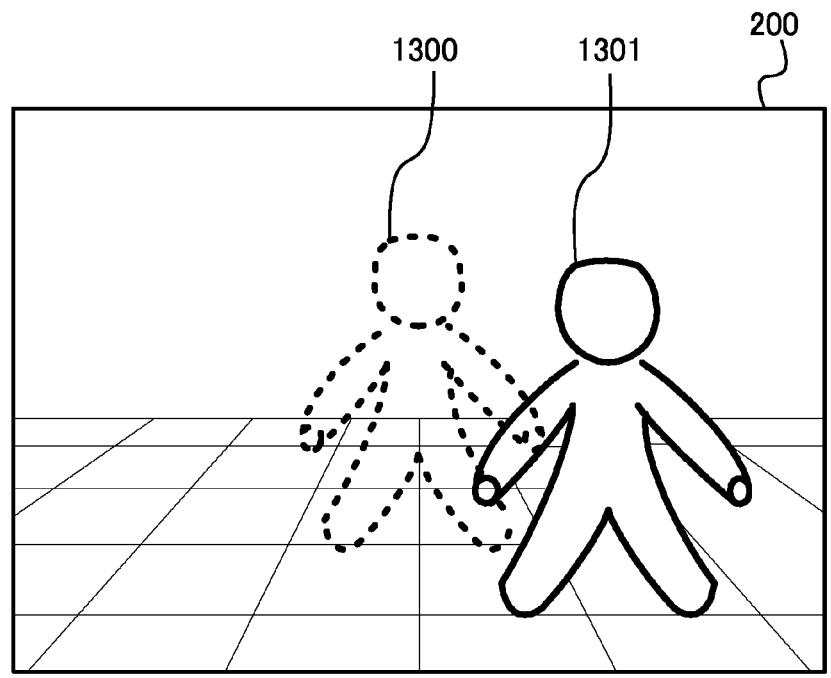
FIG. 13A is an image, in a variation of the embodiment, that is displayed on the screen of a monitor that is used when the user performs positional adjustment after the user moves from the proper position and a warning is outputted.
Figure 13B:
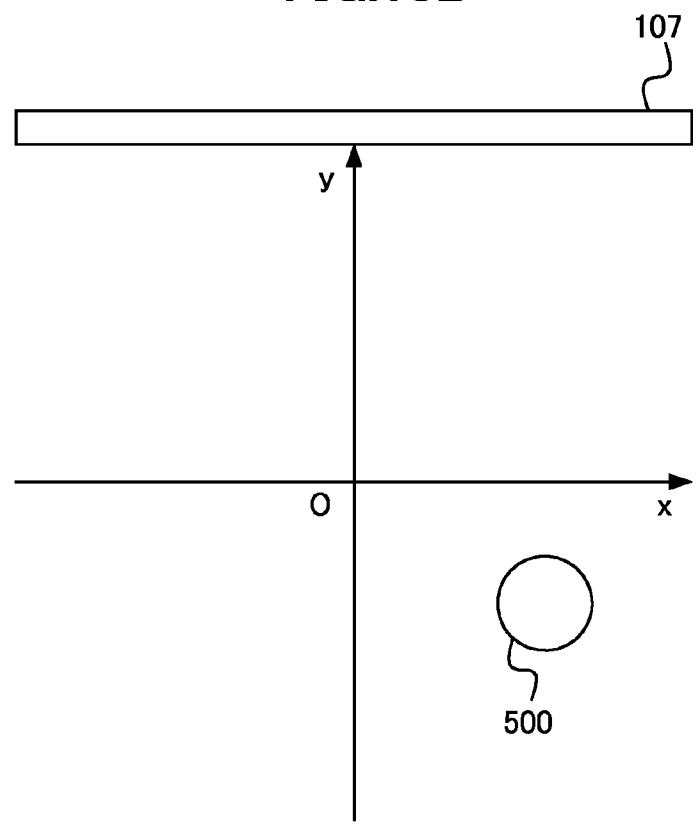
FIG. 13B is a diagram illustrating the positional relationship between the user and the input device when a warning is outputted.

Moreover, construction is also possible in which, when the user 500 moves a certain distance away from the proper position (FIG. 13B), an image such as illustrated in FIG. 13A is displayed on the monitor 200 in order to prompt the user 500 to perform operation to match the user object 1301 with the reference human-like object 1300.

Figure 14A:
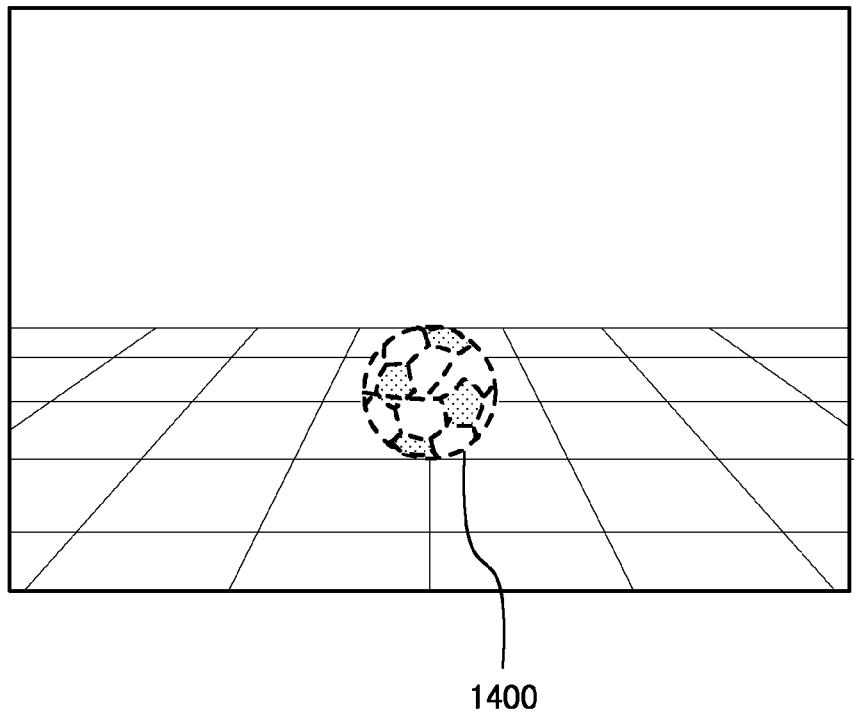
FIG. 14A is a screen on a monitor on which an object is displayed when the vagueness of the object is applied to the clarity.
Figure 14B:
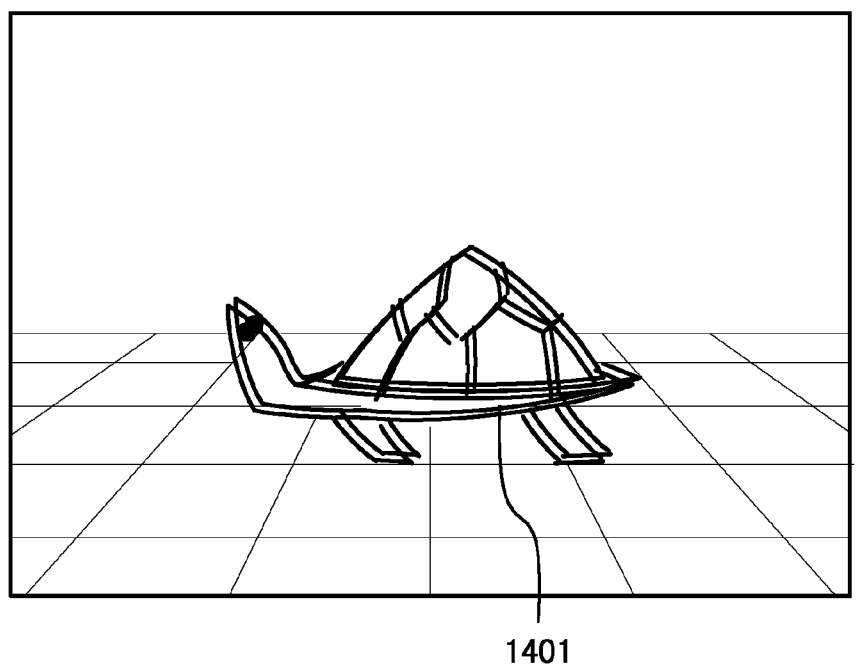
FIG. 14B is a screen on a monitor on which an object is displayed when blurriness of the object is applied to the clarity.

Furthermore, in the embodiment above, the magnification rate of the size of an object was defined as the clarity, however, as illustrated in FIG. 14A, for example, it is possible for the display of the object 1400 to become more vague as the clarity becomes lower. As illustrated in FIG. 14B, it is also possible to display a blurry contour of the object 1401 as the clarity become lower. It is also possible to display a combination of these.

In this embodiment, the generation unit 303 generated images so that for a plurality of objects that are displayed on the monitor 200 by the display unit 304, each image has different clarity; however, it is also possible to change the clarity of the entire image displayed on the monitor 200. For example, in this embodiment, it is possible to make the clarity of the two soccer balls in FIG. 9A the same. As a result, when the two soccer balls are small and difficult for the user 500 to see, the user 500 knows that his/her position is too far from the input device 107. It is also possible to add a background to FIG. 9A, and for the clarity of the background and the two soccer balls to be different.

Moreover, the present invention can also be applied to a game that causes the user's 500 own shape to be displayed on the monitor 200. For example, it is possible to change the size of the object 501 as in the embodiment above while keeping the size of the user 500 that is displayed on the monitor 200 constant.

As explained above, with the present invention, it is possible to provide a game device, a game control method and a computer readable non-transitory information recording medium with a program recorded thereon that are suitable for adjusting the standing position of a user in real space in a game that reproduces the movement of the user in real space in virtual space.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A game device comprising:
   a detection unit that detects the position of a user in real space;
   an acquisition unit that determines clarity that is correlated with the detected position of the user;
   a generation unit that generates an image that expresses a state of an object placed in virtual space that is drawn with the clarity determined for the object; and
   a display unit that displays the generated image on a screen.

2. The game device according to claim 1, wherein
   the detection unit takes an image of a shape of the user, and detects the position of the user according to the position of the user located in and the size of the user in the image that was taken; and
   the acquisition unit further determines that the further the position is from a specified reference position the lower the clarity of the object.

3. The game device according to claim 1, wherein
   the detection unit takes an image of the shape of the user, and detects the position of the user according to the position of the user located in and the size of the user in the image that was taken; and
   the acquisition unit further determines that the greater the difference of a size of the shape of the taken image and a specified reference size the lower the clarity of the object.

4. The game device according to claim 1, wherein
   the generation unit generates the image by drawing the object while applying an image filter that corresponds to the determined clarity.

5. The game device according to claim 1, wherein
   the generation unit, after generating an image expressing the state of the virtual space, applies an image filter that corresponds to the determined clarity to that image, and generates the image.

6. The game device according to claim 1, wherein
   the generation unit generates the image by drawing the object at a size that corresponds to the determined clarity.

7. The game device according to claim 1, wherein
   the generation unit generates the image by drawing the object at a position that corresponds to the determined clarity.

8. A game control method that is executed by a game device comprising a detection unit, an acquisition unit, a generation unit and a display unit, comprising steps of:
   the detection unit detecting the position of a user in real space;
   the acquisition unit determining clarity that is correlated with the detected position of the user;
   the generation unit generating an image that expresses the state of an object placed in virtual space that is drawn with the clarity determined for the object; and
   the display unit displaying the generated image on a screen.

9. A computer readable non-transitory information recording medium on which a program is recorded and that causes a computer to function as:
   a detection unit that detects the position of a user in real space;
   an acquisition unit that determines clarity that is correlated with the detected position of the user;
   a generation unit that generates an image that expresses the state of an object placed in virtual space that is drawn with the clarity determined for the object; and
   a display unit that displays the generated image on a screen.

* * * * *